(12) United States Patent
Jacobs et al.

(10) Patent No.: US 7,717,102 B2
(45) Date of Patent: May 18, 2010

(54) REVERSE ENGINE ROTATION DETECTION SYSTEM

(75) Inventors: John A. Jacobs, Fenton, MI (US); Kelly T. Jozefowicz, Highland, MI (US)

(73) Assignee: GM Global Technology Operations, Inc.

( * ) Notice: Subject to any disclaimer, the term of this patent is extended or adjusted under 35 U.S.C. 154(b) by 160 days.

(21) Appl. No.: 12/132,666

(22) Filed: Jun. 4, 2008

(65) Prior Publication Data

US 2009/0063004 A1    Mar. 5, 2009

Related U.S. Application Data

(60) Provisional application No. 60/966,845, filed on Aug. 30, 2007.

(51) Int. Cl.
*F02P 11/02* (2006.01)
*F02P 11/06* (2006.01)

(52) U.S. Cl. .................................. 123/631; 123/198 D
(58) Field of Classification Search ................. 123/631, 123/630, 198 D, 479; 701/101, 112; 73/114.26
See application file for complete search history.

(56) References Cited

U.S. PATENT DOCUMENTS

| 5,622,153 | A * | 4/1997 | Ott et al. ...................... 123/476 |
| 6,578,550 | B1 * | 6/2003 | Rupp et al. ............. 123/406.13 |
| 6,691,690 | B2 * | 2/2004 | Shin ............................ 123/631 |
| 2003/0041847 | A1 * | 3/2003 | Shin ............................ 123/631 |

* cited by examiner

*Primary Examiner*—Mahmoud Gimie

(57) ABSTRACT

A method of determining reverse engine rotation includes calculating a ratio of on time to off time of a camshaft position signal during camshaft rotation, determining whether a predetermined camshaft state has been entered based on said ratio, comparing the most recently determined camshaft state with a predetermined camshaft state pattern for forward engine rotation and determining a engine rotation direction based on said comparison.

17 Claims, 4 Drawing Sheets

REVERSE ENGINE ROTATION DETECTION SYSTEM

CROSS-REFERENCE TO RELATED APPLICATIONS

This application claims the benefit of U.S. Provisional Application No. 60/966,845, filed on Aug. 30, 2007. The disclosure of the above application is incorporated herein by reference in its entirety.

FIELD

The present disclosure relates to internal combustion engines, and more particularly to systems and methods for detecting reverse engine rotation.

BACKGROUND

An internal combustion engine generally operates in four modes; an intake mode, a compression mode, a combustion mode and an exhaust mode. During reverse rotation of an engine, the engine cycle executes in a reverse order whereby the compression mode is followed by the intake mode. For example, when an engine that is stopped begins to start again, the engine may have a cylinder that was in a compression mode at the moment of stopping. Compression pressure in the cylinder may push a piston in reverse toward bottom dead center (BDC). When engine speed increases, a cylinder with injected fuel may experience ignition and the reverse rotation may be accelerated.

Conventional engines will rarely rotate in reverse for long periods of time. Torque control systems are capable of limiting the duration of the reverse rotation. However, the issue of reverse engine rotation arises more frequently in hybrid electric propulsion systems. Hybrid vehicle control errors may cause an electric machine to rotate the internal combustion engine in reverse for relatively long durations at higher speeds. Conventional torque control systems are not able to control torque under these conditions.

If reverse rotation occurs, engine components such as the intake manifold can be damaged. Reverse rotation may cause a compressed air/fuel mixture to flow back into the intake manifold during the intake stroke through an open intake valve. Pressure in the intake manifold increases. If further reverse rotation occurs, pressure may increase further and cause damage to the intake manifold.

In addition to damage to the intake manifold, reverse rotation of the engine may cause further problems such as excess bearing wear and damage to gaskets, hoses and sensors connected to the intake manifold.

SUMMARY

A method of determining reverse engine rotation includes calculating a ratio of on time to off time of a camshaft position signal during camshaft rotation, determining whether a predetermined camshaft state has been entered based on said ratio, comparing the most recently determined camshaft state with a predetermined camshaft state pattern for forward engine rotation and determining an engine rotation direction based on said comparison.

In addition, a reverse engine rotation detection system includes a camshaft state detection module that calculates a ratio of on time to off time of a camshaft position signal and determines whether a predetermined camshaft state has been entered based on said ratio. A comparison module compares the camshaft state to a camshaft state pattern for forward engine rotation and determines engine rotation direction based on the comparison.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
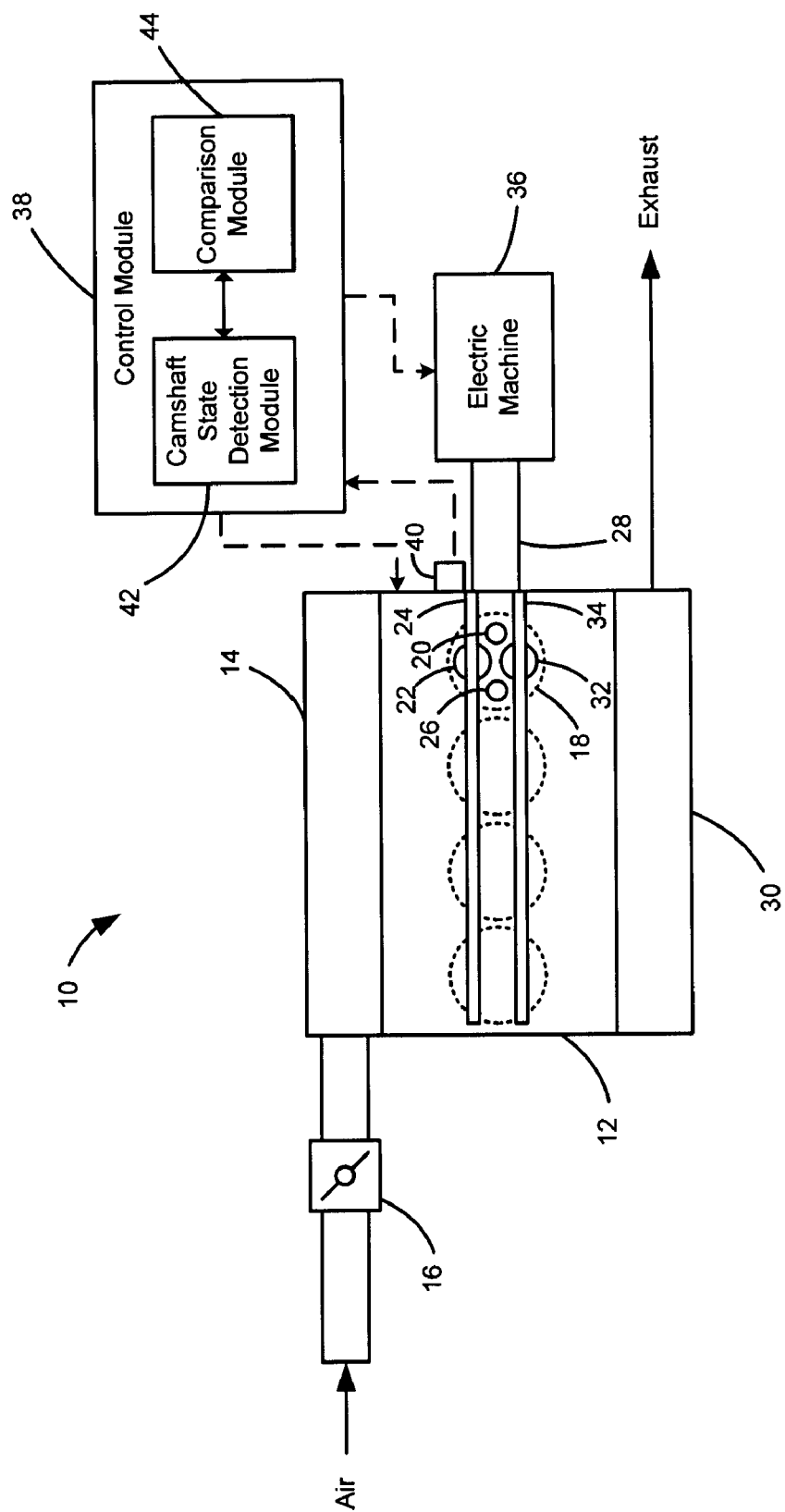
FIG. 1 is a schematic illustration of a hybrid propulsion system including a revere engine rotation detection system according to the present disclosure.

The following description of the preferred embodiment(s) is merely exemplary in nature and is in no way intended to limit the disclosure, its application, or uses. For purposes of clarity, the same reference numbers will be used in the drawings to identify the same elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine propulsion system 10 includes an internal combustion engine 12 that combusts an air and fuel mixture to produce drive torque. Air is drawn into an intake manifold 14 through a throttle 16. The throttle 16 is electronically controlled to regulate mass air flow into the intake manifold 14. Air within the intake manifold 14 is distributed into cylinders 18. Although four cylinders 18 are illustrated, it can be appreciated that the engine propulsion system of the present disclosure can be implemented in engines having a plurality of cylinders including, but not limited to, 2, 3, 5, 6, 8, 10, 12 and 16 cylinders.

A fuel injector 20 injects fuel that is combined with the air as it is drawn into the cylinder 18 through an intake port. An intake valve 22 selectively opens and closes to enable the air/fuel mixture to enter the cylinder 18. The intake valve position is regulated by an intake camshaft 24. A piston (not shown) compresses the air/fuel mixture within the cylinder 18. A spark plug 26 initiates combustion of the air/fuel mixture, driving the piston in the cylinder 18. The piston drives a crankshaft 28 to produce drive torque.

Combustion exhaust within the cylinder 18 is forced out through an exhaust manifold 30 when an exhaust valve 32 is in an open position. The exhaust valve position is regulated by an exhaust camshaft 34. The exhaust is treated in an exhaust system (not shown). Although single intake and exhaust valves 22,32 are illustrated, it can be appreciated that the engine 12 can include multiple intake and exhaust valves 22,32 per cylinder 18. An electric machine 36 provides an alternate source of power to propel the vehicle. Electric machine 36 may be used as a starter motor to rotate the crankshaft 28 of the engine 12. A control module 38 senses inputs from the engine system and responds by controlling the aforementioned components of the propulsion system 10. For purposes of clarity, the following discussion relates to the intake camshaft 24 (hereinafter referred to as camshaft 24). As can be appreciated, a similar approach can also be applied to the exhaust camshaft 34.

Figure 2:
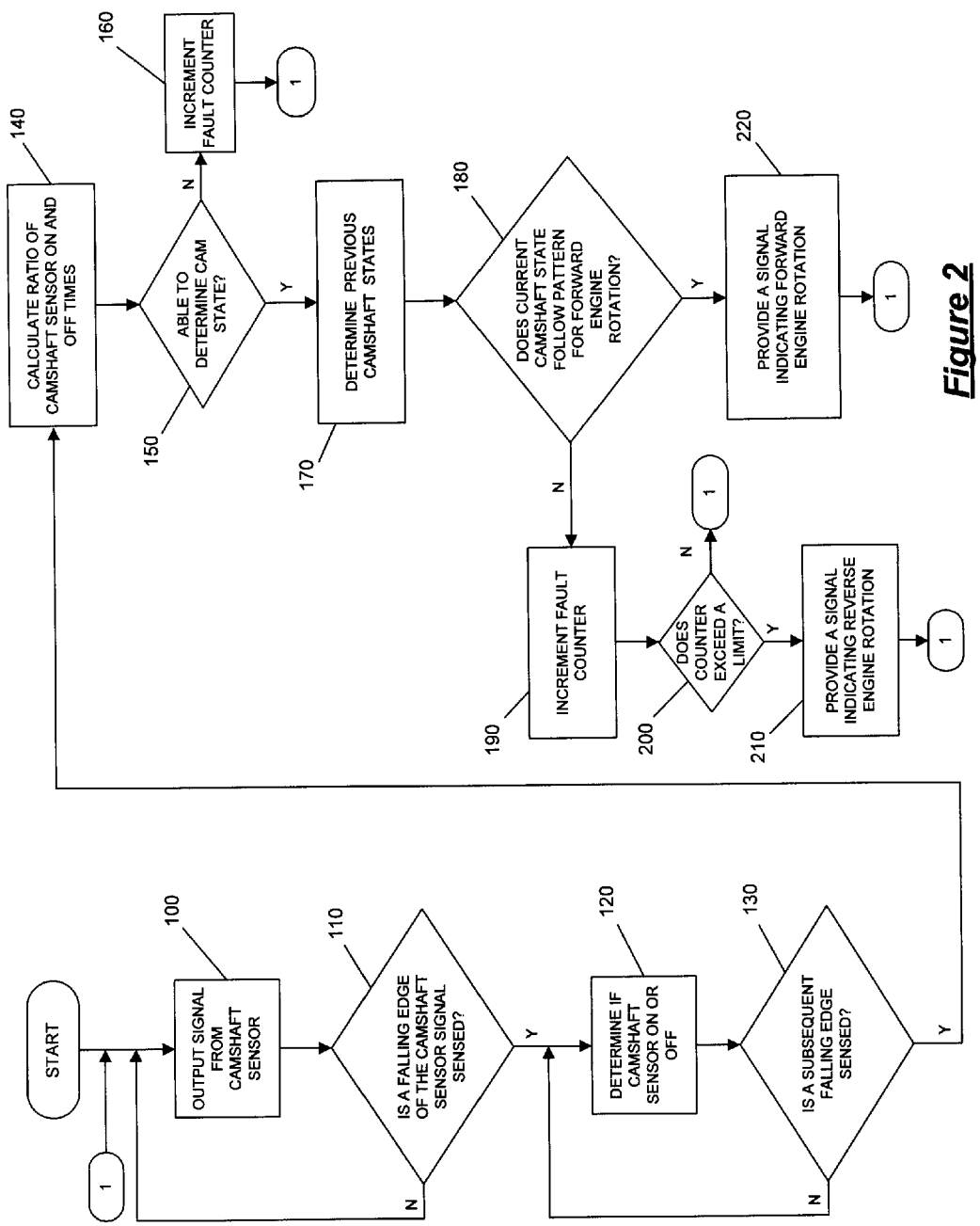
FIG. 2 is a flowchart illustrating the steps for identifying reverse rotation of an engine of the propulsion system.

Control module 38 can determine when the engine 12 is operating in reverse rotation by evaluating a signal generated by a camshaft sensor 40. In particular, a camshaft state detection module 42 calculates a ratio of on time to off time of a camshaft position signal and determines whether a predetermined camshaft state has been entered based on the ratio. A comparison module 44 is in communication with camshaft state detection module 42 and compares the camshaft state to a predetermined camshaft state pattern for forward engine rotation. Referring now to FIGS. 1 and 2, the flow of control executed by the control module 38 will be described in more detail.

Figure 3:
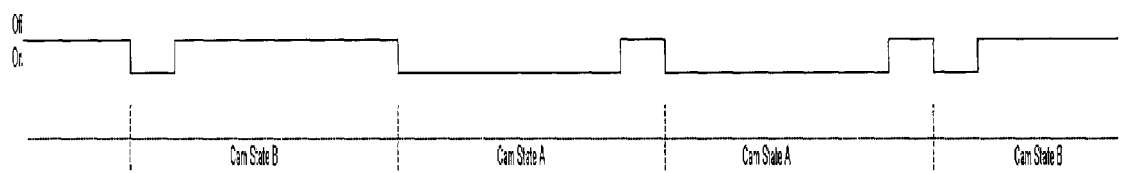
FIG. 3 is a graph illustrating an exemplary camshaft sensor signal.

In step 100, camshaft sensor 40 outputs a signal. More particularly, camshaft sensor 40 is operable to output a high signal when "ON" and a low signal or no signal when the camshaft sensor 40 is "OFF." A high signal is output when camshaft sensor 40 detects a portion of a 4× cam pattern on camshaft 24 such as a tooth of a tone wheel. A low signal is output when camshaft sensor 40 does not sense the presence of a feature of the cam pattern. Accordingly, a signal trace similar to the trace depicted in FIG. 3 is generated by the output of camshaft sensor 40. The graph of FIG. 3 represents an exemplary predetermined repeating pattern of camshaft state B, camshaft state A, camshaft state A and camshaft state B corresponding to forward rotation of the engine. In this example, the pattern repeats every complete rotation of the camshaft 24. Other frequencies for pattern repetition may also be used.

At step 110, control determines if a falling edge of the camshaft sensor signal is sensed. If a falling edge is not sensed, control returns to step 100. If a falling edge of the sensor signal is sensed, a determination is made if the camshaft sensor is ON or OFF at step 120. At step 130, control determines if a subsequent falling edge of the camshaft sensor signal is sensed. If a subsequent falling edge is not sensed, control returns to step 120 where the trace of FIG. 3 continues to be monitored. If a falling edge is sensed, controller module 38 evaluates the signal between the falling edges. In particular, control calculates a ratio of camshaft sensor ON time to camshaft sensor OFF time at step 140.

At step 150, control attempts to determine if one of the predetermined camshaft states, A or B, has been entered during the period of time between the most recent falling edges of the camshaft sensor signal. It may be determined that camshaft state A has been entered if a target ratio has been met or if the calculated ratio is within a range of target ratios. For example, a low camshaft sensor signal may exist for approximately three quarters of the time, while a high signal may exist for the remaining one quarter of time analyzed. Similarly, it may be determined that camshaft state B has been entered if camshaft sensor 40 outputs a low signal for approximately one quarter of the time between consecutive falling edges while a high signal is output for approximately three quarters of the time. It should be appreciated that if the calculated ratio is not within a target ratio range for camshaft state A or camshaft state B, the camshaft state is "undetermined" and control proceeds to step 160 where a fault counter is incremented. After the fault counter has been incremented, control returns to step 100. If control is able to determine that camshaft state A or camshaft state B has been entered, the previous two camshaft states are determined at step 170.

At step 180, it is determined if the current camshaft state follows the predetermined pattern for forward engine rotation. Based on a review of the two previous camshaft states, it can be determined which subsequent camshaft state should be entered if the engine is rotating in the forward direction. If the current camshaft state does not follow the pattern for forward engine rotation, control continues to step 190 where the fault counter is incremented. At step 200, it is determined if the fault counter exceeds a predetermined limit. If the limit has not been exceeded, control returns to step 100. If the fault counter limit has been exceeded, a signal is provided indicating reverse engine rotation at step 210.

If the current camshaft state follows a pattern indicating forward engine rotation at step 180, control continues to step 220 where a signal is provided indicating forward engine rotation. Control then returns to step 100.

Figure 4:
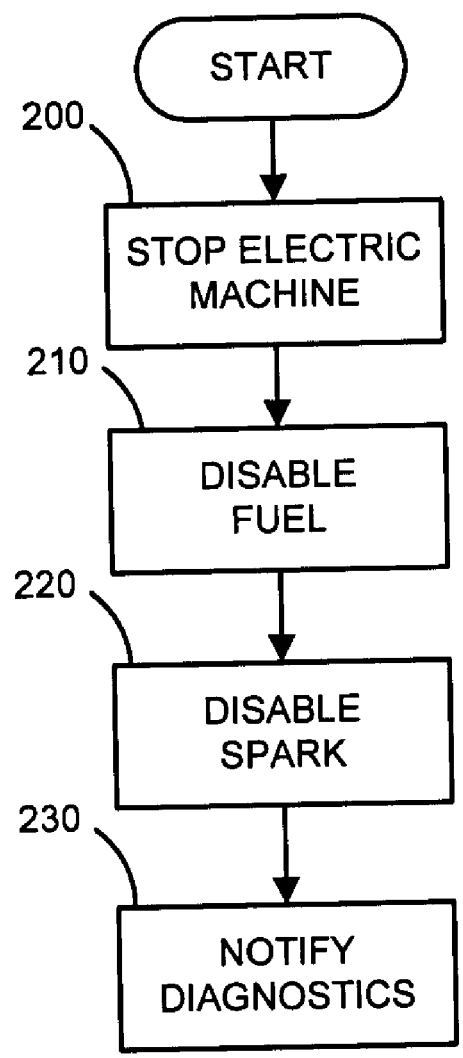
FIG. 4 is a flow chart illustrating the steps that may be taken after reverse engine rotation is detected.

Referring now to FIGS. 1 and 4, once control determines the engine 12 is rotating in reverse, subsequent actions are taken to protect engine propulsion system 10. FIG. 4 is a flowchart illustrating the steps taken by the control module 38. In step 200, control commands the electric machine 36 to stop reverse rotation. In step 210, control disables fuel by commanding the fuel injector 20 to cease operation. In step 220, control disables spark by commanding spark plug 26 to cease firing. The actions of steps 210 and 220 are likely to occur at the same time. In step 230, control will notify an on-board diagnostic module of the reverse rotation condition. The diagnostic module can set a diagnostic code and perform any diagnostic functions if the diagnostic module determines to do so.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A method of determining reverse engine rotation, comprising:
   calculating a ratio of on time to off time of a camshaft position signal during camshaft rotation;
   determining whether a predefined camshaft state has been entered based on said ratio;
   comparing the most recently determined camshaft state with a predetermined camshaft state pattern for forward engine rotation; and
   determining an engine rotation direction based on said comparison.

2. The method of claim 1 further including indicating a fault when reverse engine rotation is determined.

3. The method of claim 2 further including providing a signal indicating reverse engine rotation when a number of faults have been counted.

4. The method of claim 3 further including restricting a supply of fuel to said engine based on receipt of said signal indicating reverse engine rotation.

5. The method of claim 1 further including indicating a fault if a predetermined camshaft state has not been entered.

6. The method of claim 1 wherein determining if a predefined camshaft state has been entered includes comparing said ratio to target ratios.

7. The method of claim 1 wherein calculating a ratio of on time to off time is performed using data collected between consecutive falling edges of said camshaft position signal.

8. The method of claim 1 wherein said predetermined camshaft state pattern for forward engine rotation repeats every full rotation of said camshaft.

9. The method of claim 1 wherein said predetermined camshaft state pattern includes, in sequence, camshaft state A, camshaft state A, camshaft state B and camshaft state B.

10. The method of claim 1 wherein said camshaft position signal includes one of an on and an off signal when a portion of a tone wheel is proximate a camshaft position sensor.

11. The method of claim 1 wherein determining an engine rotation direction includes determining forward engine rotation when a plurality of recently determined consecutive camshaft states matches said camshaft state pattern for forward engine rotation.

12. A reverse engine rotation detection system, comprising:
- a camshaft state detection module that calculates a ratio of on time to off time of a camshaft position signal and that determines whether a predetermined camshaft state has been entered based on said ratio; and
- a comparison module that compares said camshaft state to a camshaft state pattern for forward engine rotation and determines engine rotation direction based on said comparison.

13. The detection system of claim 12 wherein said camshaft state detection module evaluates a portion of said camshaft position signal between subsequent falling edges of said signal to determine if a predetermined camshaft state has been entered.

14. The detection system of claim 13 wherein one of the predetermined camshaft states includes said off time being substantially longer than said on time.

15. The detection system of claim 14 wherein said camshaft state detection module determines entry into one of said predetermined camshaft states based on said ratio being within a range of target ratios.

16. The detection system of claim 15 wherein said comparison module outputs a fault signal when forward engine rotation has not been determined.

17. The detection system of claim 16 wherein said comparison module provides a signal indicating reverse engine rotation when a number of faults have been counted.

* * * * *